United States Patent [19]

Rostrom

[11] Patent Number: 4,831,773
[45] Date of Patent: May 23, 1989

[54] CRUSTACEAN HARVESTING METHOD AND SYSTEM

[76] Inventor: William C. Rostrom, 1714 Haver St., Houston, Tex. 77006

[21] Appl. No.: 195,620

[22] Filed: May 18, 1988

[51] Int. Cl.⁴ .............................................. A01K 80/00
[52] U.S. Cl. ..................................................... 43/100
[58] Field of Search ................. 43/100, 101, 102, 4.5, 43/4; 119/2

[56] References Cited

U.S. PATENT DOCUMENTS

| | | | |
|---|---|---|---|
| 769,910 | 9/1904 | Melbye | 43/100 |
| 2,922,282 | 1/1960 | Dohrer | 43/100 |
| 4,184,283 | 1/1980 | Wyman | 43/102 |
| 4,718,192 | 1/1988 | Louk | 43/100 |

Primary Examiner—M. Jordan
Attorney, Agent, or Firm—John S. Schneider

[57] ABSTRACT

A method and apparatus for harvesting crustaceans in a shallow body of water use submerged traps in which the crustaceans are trapped connected into a piping system that is periodically flushed with water to wash the trapped crustaceans to a suitable receiver. The traps have valves that may be periodically shaken to loosen any crustaceans caught in the valves. Means are also provided to aerate the piping system and body of water. The trapping, flushing and aerating steps may be repeatedly carried out while the apparatus is maintained in a stationary position in the body of water.

31 Claims, 6 Drawing Sheets

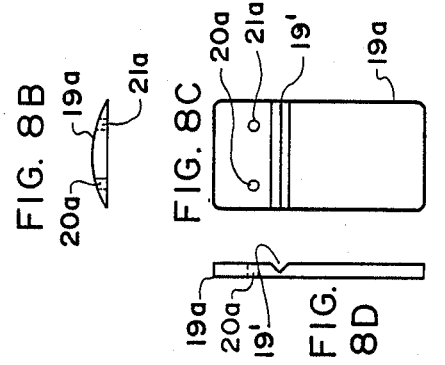
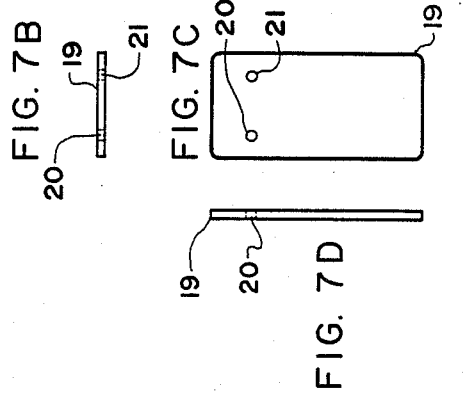
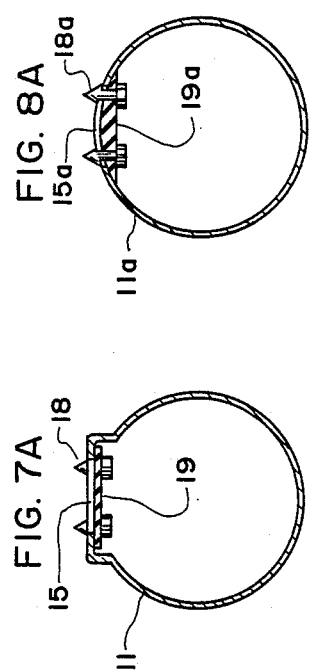
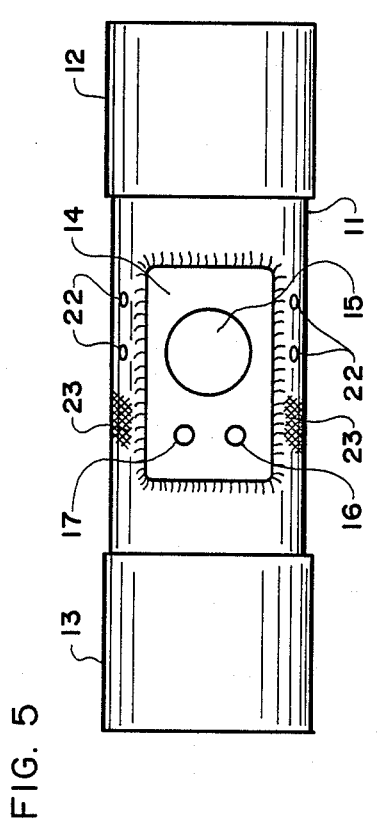
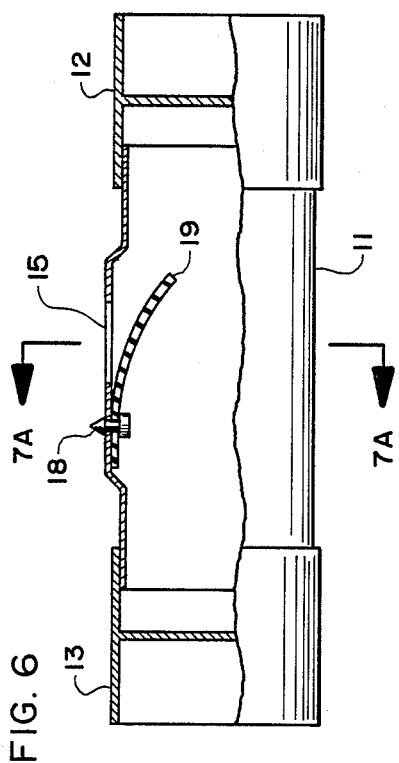

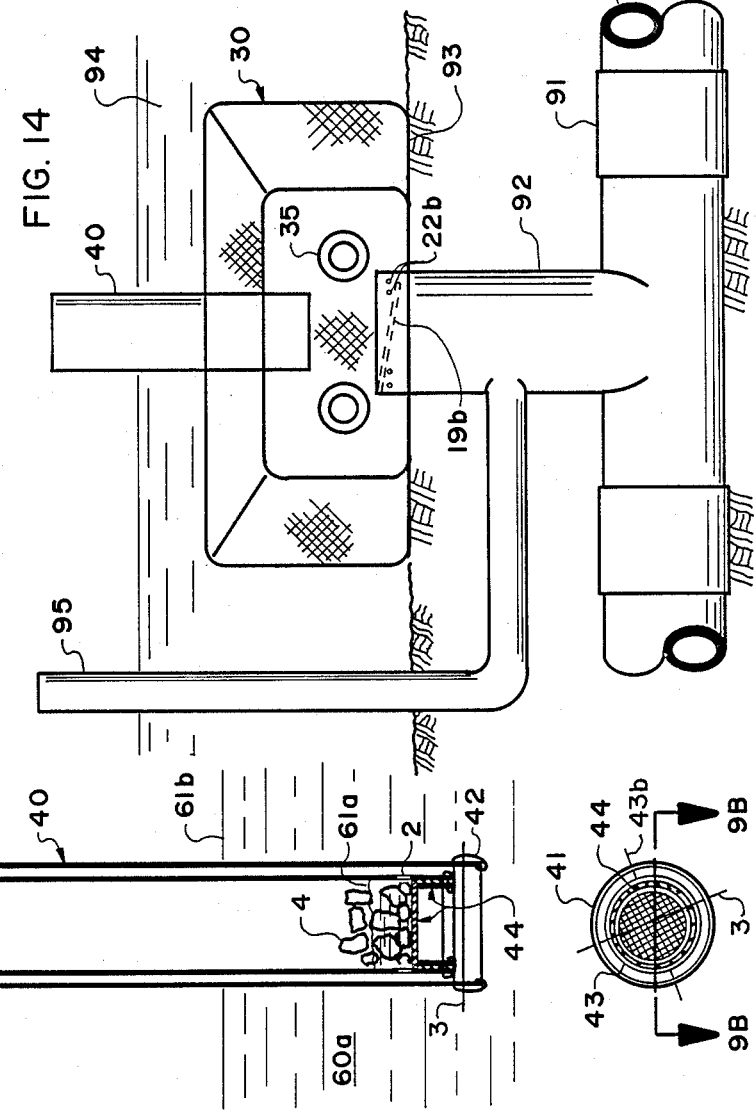

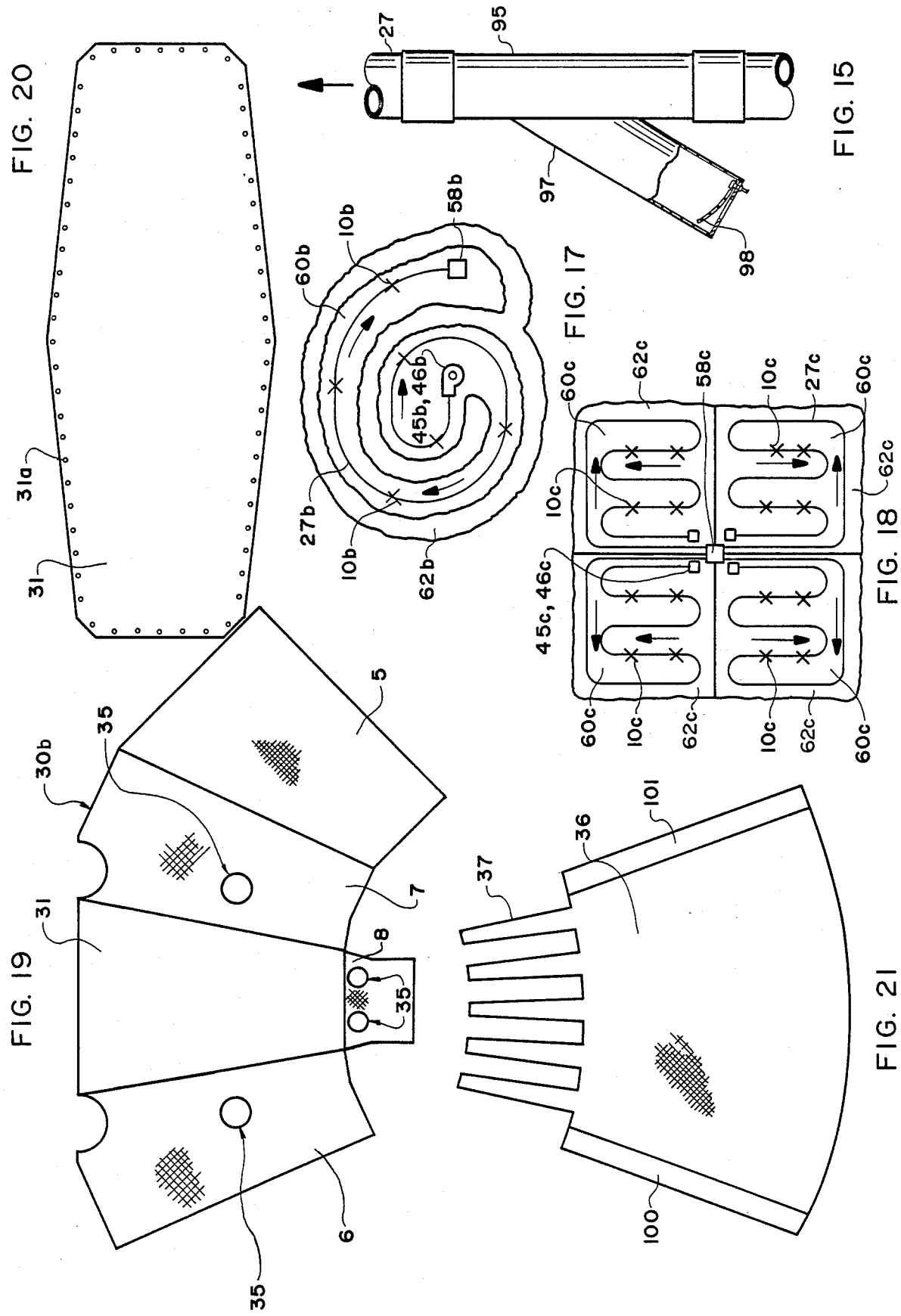

CRUSTACEAN HARVESTING METHOD AND SYSTEM

FIELD OF THE INVENTION

The present invention concerns harvesting crayfish or other edible crustaceans, such as crabs and lobsters. More particularly, the invention concerns a method and system for trapping and collecting edible crustaceans.

DESCRIPTION OF THE PRIOR ART

A method and apparatus for harvesting edible crustaceans are described and claimed in U.S. Pat. No. 4,554,759 entitled "Method and Means For Harvesting Crayfish", patented Nov. 26, 1985 by Edling et al. That patent also discusses other prior art practices for catching/trapping crayfish, including those disclosed in several patents cited therein, that include the simple technique of tieing a piece of meat to a string and netting the crayfish when it comes to the surface to more sophisticated trapping arrangements, such as that described in and claimed in the '759 patent itself.

That patent discloses and claims a method and apparatus for harvesting crayfish in which a plurality of one way traps are aligned in a linear array and supported by a frame that extends above the water level of a shallow aquatic bed. The traps are lowered into the water for a set time and then raised to discharge the collected crayfish into a collection hopper. While the traps are out of the water the linear array is advanced several (3 to 12) meters along an axis substantially perpendicular to the axis of the array. The crayfish are conveyed from the collection hopper to a storage tank by a water conveyor. The setting, discharging and resetting of the traps is continued until the harvester has traversed the aquatic bed.

SUMMARY OF THE INVENTION

The apparatus of the present invention broadly comprises at least one trap means for capturing crustaceans and pipe means connected to the trap means for transporting captured crustaceans to suitable storage or collection means. The trap means comprises a short pipe section having a valve member on the pipe section that functions to close and open an opening in the pipe section. The valve member is preferably a flapper type valve closed by water flow through the pipe means. A mesh cage preferably surrounds the trap means and is provided with conically shaped funnels permitting crustaceans to enter the cage but preventing or inhibiting exiting of the crustaceans from the cage. A bait receptacle extends from the top of the cage to above the surface of the water in which the trap and pipe means are arranged.

The trap means and pipe means comprise a stationary crustacean harvesting system located in a shallow pond or other shallow body of water. That system includes a pipeline connected to each end of the valve-containing pipe section. The upstream end of that pipeline is connected to a pump and the downstream end of the pipeline is connected to a crustacean collection means. The pump may be manually or automatically operated to cause periodic flushing of the harvesting system to wash crustaceans trapped by the trap means to the collection means through the pipeline. The harvesting system may include means for aerating the pond water and shaker means to cause release of any crustaceans caught in the valve of the trap means.

In an alternate arrangement, in accordance with the invention, the pipeline may be buried in the ground underlying the body of water instead of resting on that ground. In such arrangement a pipe extends upwardly from the subterrainian pipeline and the valve member is mounted on the upper end of that pipe to close and open the upper end to form the trap means. Another pipe may extend from the extension pipe to above the water's surface to permit washing out dirt and other debris from that pipe.

In the method of the invention, crustaceans are trapped in a stationary pipe system and periodically washed or flushed from the pipe system into receivers or collectors for collection. The pipe system may be manually or automatically flushed of the trapped crustaceans. Also, the method encompasses aerating the flushing water and the pond water and shaking the pipe system to release crustaceans possibly caught in the entrapment apparatus, particularly the trapping valves.

The valve and other parts of the pipe system are designed for quick and easy fabrication and installation. The cage elements may be precut flat pieces for convenient storage and handling and for easy hand fabrication.

Significant features of the harvesting system of the invention include the following:

Crustaceans are trapped, the harvestor pond water is aerated, caught crustaceans are flushed or washed to a receiver or holding tank located in a convenient place, the caught crustaceans can be aerated in the holding tank, and the system is easily assembled and disassembled, is stationary during operation and can be permanently installed underground. Other features of the system are: unwanted stunted crustaceans can be culled out readily, trapping labor can be saved, the ability to spread the bait scent saves bait, running aerated water may be used to attract crustaceans; streams of water may be used to spread the bait scent from the bait placed in the trap means or from the bait scent placed in the pumping system by suitable means, water or mud is not stirred up thereby saving some crustaceans from death, existing traps with modification can be used, cool water in warm weather and warm water in cool weather may be used as attractants, the water may be about one foot deep or deeper, there are very few moving parts to be serviced, floating vegetation (shade) is not a problem, levees can be crossed to higher or lower fields without syphoning water to the lower field from the higher field (vacuum breaker), and gasoline powered motors, electric motors or other power means may be used. The controls can be manually operated or automatically operated using a timer. The system can be used in densely terraced fields thus creating concentration areas for the crustaceans by pumping from the lowest field in the system and discharging the catch in the highest field into a holding tank, then pipes in the levees allow the pumped water to return to the lowest field again (crayfish are attracted to and concentrate in areas of running water). The system can be designed to meet each harvesting pond's individual requirements and can be used without mesh traps in some applications. The crustaceans have nowhere to go except through the trapping valve, once trapped within the cage. Finally the young crustaceans can be returned to any location in the pond with use of a suitable pipe and screen.

BRIEF DESCRIPTION OF THE DRAWINGS

FIG. 5 is a top view of the pipe section shown in FIG. 1;

FIG. 6 is a side view of the valve and pipe section shown in FIG. 1;

FIG. 7A is a view taken on lines 7A—7A of FIG. 6;

FIGS. 7B, 7C and 7D are, respectively, end, top and side views of the flapper portion of the valve shown in FIG. 7A;

FIGS. 8A, 8B, 8C and 8D are, respectively, views of another embodiment of the valve similar to the views shown in FIGS. 7A, 7B, 7C and 7D;

FIG. 9A is a bottom end view of a bait receptacle such as shown in FIG. 1;

FIG. 9B is a view taken on lines 9B—9B of FIG. 9A;

FIG. 10A is a top view of a modified valve and pipe section;

FIG. 10B is a view taken on lines 10B—10B of FIG. 10A;

FIG. 12 is a more detailed illustration of the air collector shown in FIG. 11;

FIG. 13 is a more detailed illustration of the shaker vent shown in FIG. 11;

FIG. 14 is a side view of another embodiment of the harvesting system of the invention;

FIG. 15 is a top view of another embodiment of a trapping valve and pipe section connected to the main pipeline;

FIGS. 16, 17 and 18 are top schematic views of the trap system illustrating three possible arrangements of a plurality of trap devices;

FIG. 19 illustrates one manner of the manufacture of the top, side walls and bottom parts of one side of the cage surrounding the valve device;

FIG. 20 illustrates another manner of the manufacture of the bottom of the cage; and FIG. 21 illustrates one manner of manufacture of the funnels shown in FIGS. 1 through 4.

DESCRIPTION OF THE PREFERRED EMBODIMENTS

Figure 1:
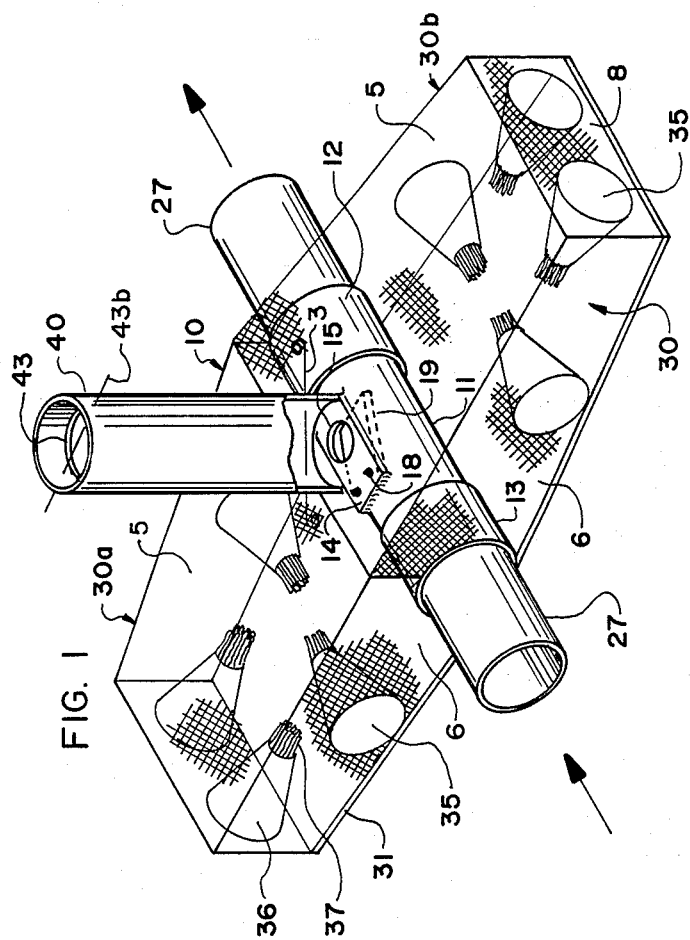
FIG. 1 is an isometric view of a crustacean trap device arranged in accordance with one embodiment of the invention.
Figure 4:
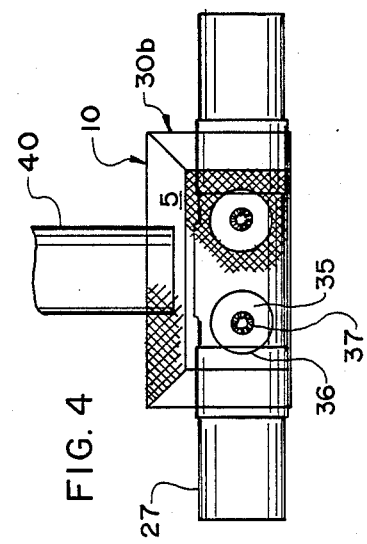
FIGS. 2, 3 and 4 are top, side and end views, respectively, of the trap device shown in FIG. 1.
Figure 2:
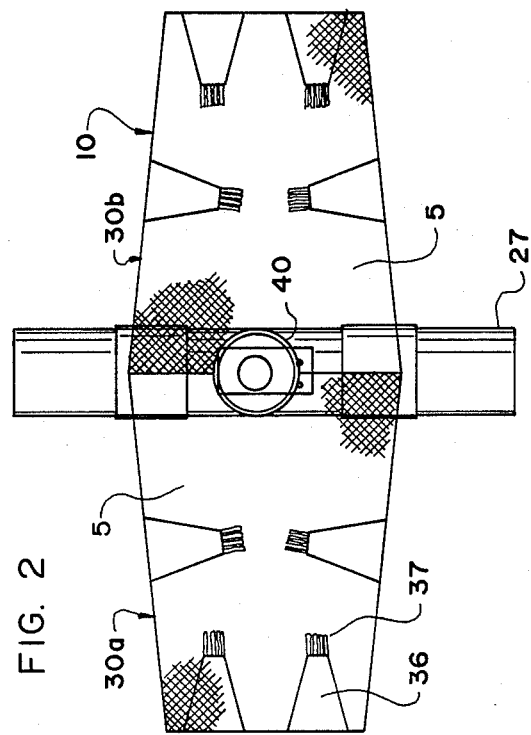
Figure 3:
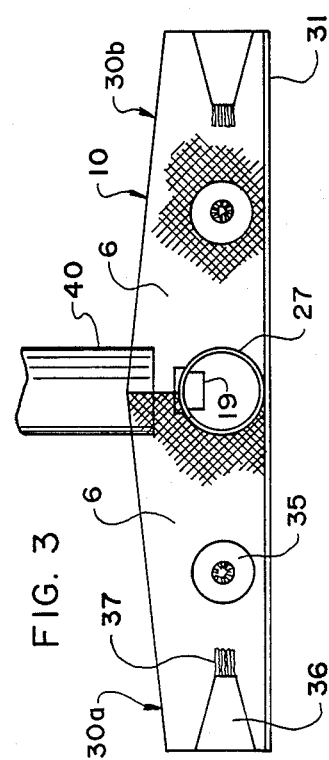

Referring to FIGS. 1 through 7 there is shown a crustacean trapping device, generally designated 10. The device includes a short pipe section 11 threaded or otherwise sealingly connected to pipe collars 12 and 13 and having a flat valve seat 14 formed on its uppermost portion. A large opening or hole 15 for trapping crustaceans is formed in valve seat 14. A flexible flapper valve 19, which may be formed of natural or synthetic rubber or other plastic material, is secured at its one end to one end of valve seat 14 by the valve keepers 18 inserted through holes 16 and 17 formed in valve seat 14 and through holes 20 and 21 formed in flapper valve 19 (see particularly FIGS. 5, 6 and 7A-D). One or more small perforations 22 may be formed in pipe section 11. These holes direct small streams of water from pipe section 11 to attract crustaceans, whether the water is aerated or nonaerated. The streams of water also clean crustaceans trapped in the cage and spread any bait scent introduced into the pumping system. Also the sides of pipe coupling 11 may be knurled, as indicated at 23, to aid crustaceans in reaching opening 15.

As seen in FIGS. 8A-D valve flapper 19A may be curved to match the curved contour of curved pipe section 11a where the inner surface of pipe section 11a forms a valve seat surrounding trap opening 15a. A notch 19' is formed in flapper 19a to facilitate movement of the flapper in opening and closing opening 15a. Valve keepers 18a and holes 20a and 21a in flapper 19a are also shown in these figures.

Referring particularly to FIGS. 1 through 4 sections of pipe, indicated at 27, that form the main flowline or pipeline connect into collars 12 and 13. The arrow in FIG. 1 shows the direction of water flow through pipeline 27 and pipe section 11. A mesh cage 30 surrounds pipe section 11 and valve seat 14 and flapper valve member 19 and includes a solid base or bottom 31.

Cage 30 may be formed in two identical halves 30a and 30b each formed of a top 5, front side 6, rear side 7, end side 8 and bottom 31. Each half is provided with a series of openings 35 to each of which is connected a funnel 36. The funnel narrows from its outer connection to the cage wall inwardly and terminates in fingers 37 as shown clearly in FIG. 21 where each funnel is shown formed of one piece of plastic or metal mesh. The bottom 31 of the cage is preferably a solid plastic or metal piece, as indicated in FIG. 19. The solid bottom permits cleaning the crustaceans before they enter the pipeline. Aerated water also helps to keep dirt and other debris from the bottom of the cage thus allowing for cleaner operations. Each side of cage 30 is made the same for easy installation (snap lock design). The cage is easily assembled. Each part may be shipped flat and, thereby, transported efficiently. The cages, when installed, are completely underwater to keep down predation from raccoons, birds, etc. The cages may be further modified to keep down predation from turtles by making mesh on the sides smaller or by using a shield (snap-in) to cover the mesh on the sides.

A bait receptacle, indicated at 40, is shown extending upwardly from Cage 30 over opening 15. FIGS. 9A and 9B show bait receptacle 40 in more detail. An outer pipe 41 is connected to the upper side of mesh cage 30 by wire (or wires) 3 extending through pipe 41 as shown in FIG. 1. A wire 42 may serve as support for an inner readily removable pipe 43 having a removable closure cap 43a and a screen 44 connected into its lower end. Pipe 43 contains natural or artificial bait in its lower end. Instead of wire 3, wire 42 may be used to connect bait receptacle 40 to cage 30. Also shown in FIGS. 9A and 9B is wire 43b extending through the upper end of pipe 41 to retain pipe 43 within pipe 41.

An alternative arrangement for the trapping pipe section is illustrated in FIGS. 10A and 10B. Instead of positioning the valve seats at the uppermost portion of the pipe section they may be positioned angularly therefrom. Thus, pipe section 11a connected into pipe collars 12a and 13a has valve seats 14a and 14b formed on the sides of pipe section 11a. Valve keepers 18a and 18b are also shown in those figures. The other elements of the trap devices will be the same as those described with reference to FIGS. 1 through 7 (or 8).

Figure 11:
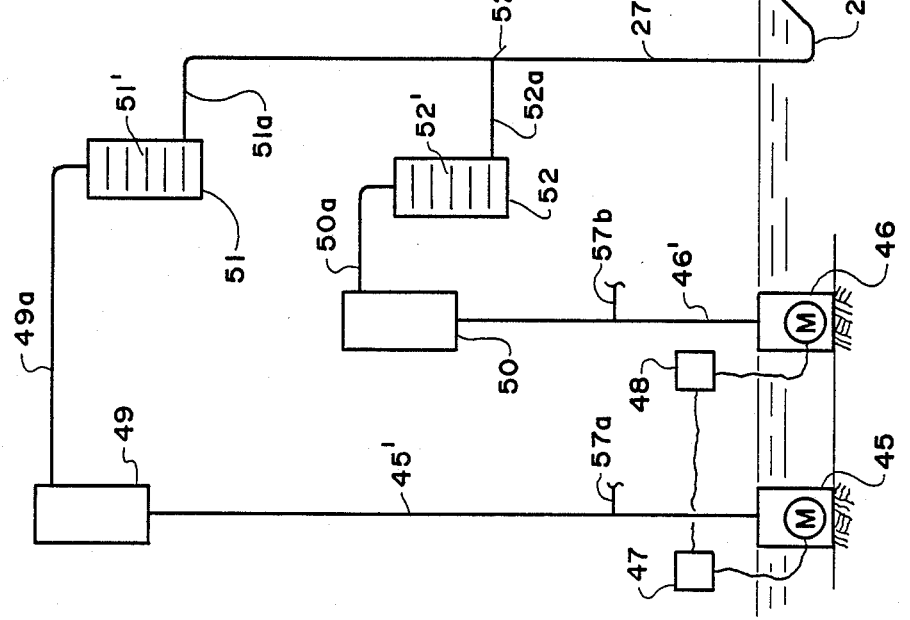
FIG. 11 is a schematic elevational view of the harvesting system in accordance with the invention.

The harvesting system illustrated in FIG. 11 includes motor driven pumps 45 and 46 operated by timers 47 and 48, respectively, back wash buckets 49 and 50, aerators 51 and 52, air collector 53, shaker vent 54, aerator and standpipe head 55, traps 10, closure valve 56 operated by a servo-cylinder arrangement 57 that is, inturn, controlled by hydraulic lines 57a and 57b, a collection basket or bucket 58 and the connecting, generally horizontal, piping system 27 (includes all main piping). The system is arranged in a shallow harvesting pond 60 having a water level indicated at 61 and an underwater ground level 61'.

In operation, an aeration cycle and a pumping cycle are employed. In the pumping cycle timer 47 actuates timer 48 to start pump 46 which pumps pond water 60 up pipe 46', through backwash bucket 50 and through piping 50a to aerator 52. Water passes downwardly over baffles 52' in aerator 52 through pipe 52a and check valve 52b and down piping 27' to main pipe 27 and then to air collector 53 where water pushes against the air pocket formed therein.

The pipe system permits use of a shaker to reseat flapper valves and shake any trash or crustaceans hung up in the system or flapper valves or holes. As shown in FIG. 12 air collector 53 may suitably be a pipe elbow 80 coupled into flowline 27 and provided with an opening 81 at its outer upper end, the closing of which is controlled by a flow actuated flapper valve 82. Flow of water in the direction of the arrowed line closes valve 82. When the system is shut down or on stop in a cycle, valve 82 opens and an air pocket is formed in pipe elbow 53. When the system is started up the air pocket is pushed to the shaker vent 54 and as the air is vented into the open air the piping system and traps are shaken. As shown in FIG. 13 shaker vent 54 may suitably be a pipe section 85 having a spring or gravity biased normally-open conventional check valve 86 closing its upper end. Openings 86a are closed by a valve element 86b forced upwardly against the bias of spring 86c by water pressure in pipe section 85 when valve 56 is closed in the aeration cycle.

As aerated pond water passes through traps 10 some of the water passes through the small holes 22 into cages 30 and pond 60 to spread the bait scent and/or aerated water to lure crustaceans into trap 10. Water flow also pushes trapped crustaceans through the pipeline 27 into basket receptacle 58 at the end of the piping system. Valve 56 is opened by actuator 57 when pump 45 pumps water through line 57a.

After a preset time, pump 46 stops. Crustaceans collect in traps 10 during both the pumping and aeration cycles. Pump 46 starts again after a preset time and the cycle is repeated.

Referring again to FIG. 9B bait receptacle 40 is shown positioned in pond water 60a with pipes 41 and 43 extending above water level 61b. Air pressure in pipe 43 keeps the water level 61a therein below water level 61b thereby immersing only a portion of bait 4. An opening 2 in pipe 43, positioned at a selected level relative to the level of screen 44 controls the water level 61a in pipe 43. As the bait underwater is eaten by crustaceans (through screen 44) and/or dissipates or dissolves in the water dry bait drops down to take its place. Bait 4 may be any material to which crustaceans are attracted, including artificial bait or natural bait of vegetable or animal origin.

In the aeration cycle, timer 47 stops pump 46 through timer 48 and starts pump 45. As mentioned, valve 56 is closed by actuator 57 when pump 45 starts up and pumps water through line 57a. Pond water 60 is pumped through backwash bucket 49 through pipe 45, and then to aerator 51 through pipe 49a. Aerator 51 contains baffles or screens 51' over which the water passes. Water then passes through pipe 51a, pipe 27' and pipeline 27 to aerator standpipe and head 55. Following a predetermined time period, timer 47 shuts down motor 45 and actuates timer 48 to start up the pumping cycle. Although described above as being automatically operated, pumps 45 and 46 may be manually controlled. The aeration screens or baffles 51' and 52' pass aerated water through piping system 27. The reservoirs 49 and 50 above pumps 45 and 46, respectively, provide water to run back through pumps 45 and 46 and out to backwash trash screens, not shown, around the pumps when the pumps are stopped. Water that passes through the entire piping system may be piped or otherwise directed back to adjacent pumps 45 and 46 to help maintain a constant temperature of the water or to contain the bait scent in the system.

Figure 16:
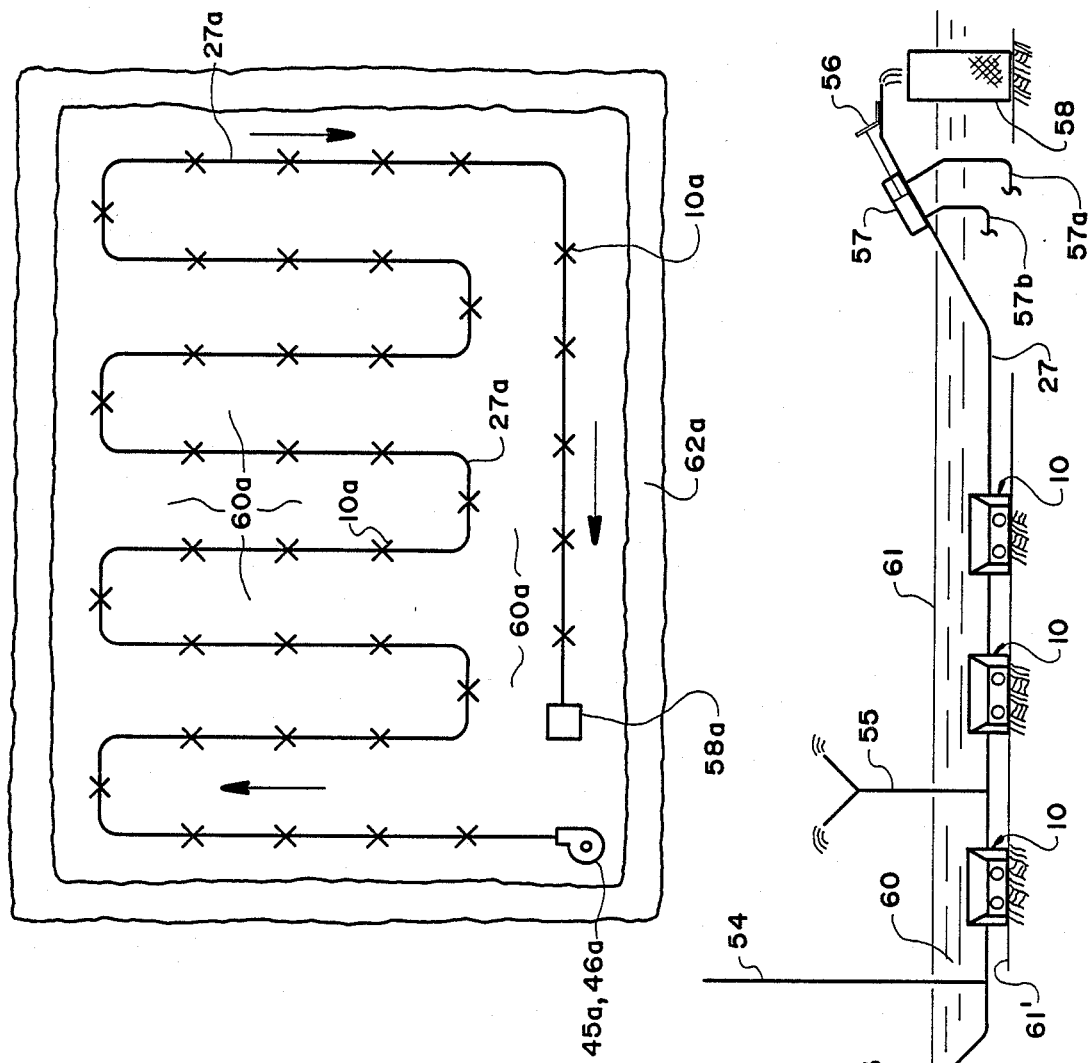

FIGS. 16, 17 and 18 illustrate three possible trap arrangements. The direction of water flow is indicated by the arrowed lines. In FIG. 16 levee 62a surrounds a pond 60a in which is arranged piping 27a along which are spaced-apart traps 10a. Pumps 45a, 46a pump pond water through piping 27a and receptacle 58a receives the flushed crustaceans. In FIG. 17 a spirally shaped levee 62b surrounds water 60b in which are arranged pumps 45b, 46b, receptacle 58b and piping 27b along which are spaced apart traps 10b. FIG. 18 illustrates use of the trapping system to operate several harvesting areas. Levees 62c separate four ponds 60c from each other. A piping system 27c and traps 10c are arranged in each pond. A receptacle 58c is common to each trapping system. The directions of flow from each of the pumps 45c, 46c are shown. If desired, a common pumping system and separate receptacles for each pond could be used. The systems may be operated together or selectively. In each of the arrangements of FIGS. 16, 17 and 18 the harvesting system described with respect to FIG. 11 is employed.

The preferred plastic pipe for the piping system is light-weight, durable, inexpensive and easy to install and take up when the harvesting season is over. Compression sealed couplings are preferred at the traps to make changing of the traps easier and to make easier picking up of pipes, if desired, after the harvesting season is over. The pipe sections may be glued together; however, the pipe would have to be cut and glued together each session. The terms "pipe", piping, flowline etc., broadly refer to hollow, tubular members used to conduct liquids and gases.

The pipe system may be installed permanently underground using tees with riser pipes to the surface of the bottom of the pond and placing a flapper valve on top of this riser and using a cage over the flapper valve. Such an arrangement is shown in FIG. 14. A subterranean flowline 27 is coupled to a "tee" pipe connection 91, the vertical extension 92 of which extends to above the bottom of cage 30 which nests on bottom 93 of shallow pond 94. A cage 30 surrounds the upper end of extension 92. A bait receptacle 40 may extend from above the water's surface into cage 30 above the upper end of extension 92. Suitable holes are made in cage 30 to accommodate both bait receptacles 40 and extension 92. The water flow, as indicated at the upper end of extension 92. The water flow, as indicated by the arrowed lines, may be in either direction through pipeline 27. Openings 22b are shown in extension 92 above ground 93. These functions to cleanse crustaceans and spread bait scent in the same way openings 22 described with respect to FIG. 5 so functioned. Another pipe 95 may be connected to extension 92 to extend above the water 94 to provide access to pipeline 90 from the surface to permit washing out dirt or other matter as may be necessary. The underground installations should use all glued couplings for durability and a maintenance free operation. The completely underground installation allows for a more constant temperature since the pipeline itself will act as a heat exchanger.

In the embodiment of FIG. 15, a horizontally extending pipe section 95 is coupled to flowline 27. A pipe 97 connected into pipe section 96 angularly instead of vertically. A flapper valve 98 is arranged in the upper end of pipe 97 for entrapping crustaceans (or catfish).

The traps are designed for easy stacking for storage and transportation purposes. The cages for the traps may be stamped out of a sheet of thermoplastic material and are lightweight and durable. One half of such a cage 30 is shown in FIG. 19 including top 5, sides 6, 7 and 8 and bottom 31. The solid bottom 31 may also be formed separate from the top and side halves as shown in FIG. 20. Perforations 31a are also indicated through which wires may be threaded and attached to the mesh of sides 6, 7 and 8 to secure the cage mesh to bottom 31 when the bottom is made separately. As shown in FIG. 21, each funnel 36 with fingers or prongs 37 may also be formed of one piece of plastic or metal mesh. The ends 100 and 101 engage to form the funnel.

The cages have no openings to allow the marketable crustaceans to escape; the entrance openings have prongs that inhibit or prevent escape of the crustaceans. Each funnel 36 preferably has a twist lock for easy removal or changing. Metal or plastic rods may be used to secure the cages to the water bottom and to hold the main pipeline to the water bottom. A wicket attached to a rod extending above the water may be used for the latter purpose.

While the flapper type valve is the preferred type valve for closing opening 15 to trap crustaceans in pipe section 11 other type commercially available valves including electrically, mechanically and hydraulically operated valves may be used instead to close and open opening 15 at the desired times.

The size of the pipeline 27 and pipe sections 11 will vary and be determined by the size of acreage in which, and the size of the crustacean for which, the harvesting system is to be used. For example, for a 150 to 200 acre pond a 3 or 4 inch diameter pipe 27 might be used. The commercially available valve keepers 18 are preferably rubber. The flapper 19 may be fabricated from an approximately ⅛ inch neoprene sheet. Various size trapping holes 15 may be used, as for example, 1½" diameter. The small holes 22 may be 1/16" diameter. Cage 30, may have any desired shape other than the one described herein.

Changes and modifications may be made in the illustrative embodiments of the invention shown and/or described herein, without departing from the scope of the invention as defined in the appended claims.

Having fully described my invention I claim:

1. A system for harvesting crustaceans comprising:
   at least one submerged trap device including a stationary pipe section having at least one opening to permit crustaceans to enter the interior of said pipe section; and
   automatically operable valve means arranged adjacent said opening for opening and closing said opening;
   said trap device and said pipe section being at the same level during operation of said harvesting system.

2. A system as recited in claim 1 in which said valve means comprises a flapper valve adapted to close when water flows through said pipe section.

3. A system as recited in claim 2 including a stationary pipeline connected to said pipe section, a pump connected to one end of said pipeline for pumping water through said pipeline and pipe section; and
   a receptacle arranged at the other end of said pipeline to receive the water pumped through said pipeline.

4. A system for harvesting crustaceans fixed in a water location comprising:
   a stationary piping system;
   at least one submerged trap means for entrapping crustaceans connected to a portion of said piping system;
   receiver means for collecting said trapped crustaceans arranged at one end of said piping system; and
   pump means connected to the other end of said piping system for pumping water through said piping system and trap means to said receiver means; said portion of said piping system and said trap means being at the same level during operation of said harvesting system.

5. A harvesting system as recited in claim 4 in which said piping system includes shaker means for shaking said pipe system when pumping water through said pipe system.

6. A harvesting system as recited in claim 5 in which said pipe system includes means for aerating said water.

7. A harvesting system as recited in claim 6 including an automatically operated closure valve for closing off flow of water from said piping system to said receiver means.

8. A method for harvesting edible crustaceans comprising the steps of:
   trapping said crustaceans in at least one trap submerged in a body of water;
   pumping water through a stationary piping system, a portion of which is connected to said submerged trap, to flush said trapped crustaceans from said trap into a storage means; and
   repeating said steps of trapping and pumping while retaining said trap and the portion of the piping system connected thereto at the same level.

9. A method as recited in claim 8 including periodically aerating said body of water during said steps of trapping and pumping.

10. A method as recited in claim 9 in which said piping system is arranged in a predetermined pattern in said body of water and said traps are spaced apart predetermined distances from each other along said piping system.

11. A method as recited in claim 10 in which said trapping and pumping steps are carried out alternately.

12. A system for harvesting crustaceans comprising:
   at least one trap device including a stationary pipe section having at least one opening to permit crustaceans to enter the interior of said pipe section;
   valve means for closing said opening comprising a flapper valve adapted to close when water flows through said pipe section;
   a stationary pipeline connected to said pipe section, a pump connected to one end of said pipeline for pumping water through said pipeline and pipe section and a receptacle arranged at the other end of said pipeline to receive the water pumped through said pipeline; and said trap device including a cage surrounding said opening in said pipe section having a series of spaced apart openings therein, each opening having a conically shaped member extending and narrowing from the wall of said cage inwardly to the interior of said cage, each member having elongated flexible fingers at its narrowed end to prevent or hinder crustaceans from leaving said cage through said members.

13. A system as recited in claim 12 in which said pipe section includes a flat valve seat for engaging said flapper valve to close said pipe section opening.

14. A system as recited in claim 12 in which said pipe section includes a curved valve seat and a curved flapper valve for engaging said curved valve seat to close said pipe section opening.

15. A system as recited in claim 12 including a bait receptacle extending upwardly from said opening in said valve seat.

16. A system as recited in claim 15 in which said bait receptacle comprises an outer pipe fixed to said cage, a removable inner pipe and a screen positioned in the lower end of said inner pipe.

17. A system as recited in claim 16 including means for retaining said inner pipe within said outer pipe.

18. A system as recited in claim 17 including means for connecting said outer pipe to said cage.

19. A system as recited in claim 18 in which said cage includes two identical members, the top, sides and bottom of each member being formed of a single piece, said top and sides being formed of meshed material and said bottoms being formed of solid material.

20. A system as recited in claim 19 in which each end of said cage contains two of said conically shaped members and each side of each half of said cage contains two of said conically shaped members, one on each side of said half.

21. A system as recited in claim 20 in which each of said conically shaped members is formed in one piece of meshed material.

22. A system as recited in claim 21 in which said pipe section contains small openings and knurling on the outer surface.

23. A system as recited in claim 22 in which said pipe section and said cage are formed of plastic non-metallic materials.

24. A system for harvesting crustaceans in a water location comprising:

a stationary piping system;

at least one submerged trap means for entrapping crustaceans connected to said piping system;

receiver means for collecting said trapped crustaceans arranged at one end of said piping system;

pump means connected to the other end of said piping system for pumping water through said piping system and trap means to said receiver means;

said piping system including shaker means for shaking said pipe system when pumping water through said pipe system;

said pipe system including means for aerating said water;

an automatically operated closure valve for closing off flow of water from said piping system to said receiver means; and said submerged trap means including a pipe section having a valve seat formed thereon, an opening in said valve seat to permit crustaceans to enter the interior of said pipe section, and a flapper valve hinged at one end to said pipe section for sealing on said valve seat when water flows through said pipe section from said pump means to said receiver means.

25. A harvesting system as recited in claim 24 in which said submerged trap device includes a mesh cage having a series of spaced apart openings therein, each opening having a conically shaped mesh member extending and narrowing from the wall of said cage inwardly to the interior of said cage, each member having elongated flexible fingers at its narrowed end to prevent or hinder crustaceans from leaving said cage through said members.

26. A harvesting system as recited in claim 25 in which said cage comprises two identical members, the top, sides and bottom of each member being formed of a single piece of material.

27. A harvesting system as recited in claim 26 in which said pipe section contains small perforations and knurled surfaces adjacent said opening in said valve seat.

28. A harvesting system as recited in claim 27 in which said piping system is located substantially underground.

29. A harvesting system as recited in claim 27 in which said piping system is arranged in a spiral configuration.

30. A harvesting system as recited in claim 27 including additional piping systems, trap means and pump means associated with one receiver means.

31. A harvesting system as recited in claim 27 including additional piping systems, trap means and receiver means connected to a common pump means.

* * * * *